United States Patent [19]

Rohwer

[11] Patent Number: 5,514,388
[45] Date of Patent: May 7, 1996

[54] ENCAPSULATED LIPID-CONTAINING FEED

[76] Inventor: Gary L. Rohwer, 29575 Bar Diamond La., Parma, Id. 83660

[21] Appl. No.: 299,822

[22] Filed: Aug. 31, 1994

[51] Int. Cl.$^6$ .................................................. A23K 1/18
[52] U.S. Cl. .................. 426/231; 426/573; 426/601; 426/635; 426/98; 426/2
[58] Field of Search ................................ 426/231, 573, 426/601, 635, 98, 2

[56] References Cited

U.S. PATENT DOCUMENTS

| | | | |
|---|---|---|---|
| 3,809,771 | 5/1974 | Mustakas | 426/364 |
| 3,821,453 | 6/1974 | Hoer | 426/506 |
| 3,865,802 | 2/1975 | Mustakas | 260/123.5 |
| 3,889,931 | 6/1975 | Adams | 259/96 |
| 3,925,560 | 12/1975 | Scott et al. | 426/2 |
| 4,042,718 | 8/1977 | Rawlings et al. | 426/573 |
| 4,120,980 | 10/1978 | Merget et al. | 426/69 |
| 4,138,505 | 2/1979 | Hart et al. | 426/573 |
| 4,199,496 | 4/1980 | Peniston et al. | 260/112 R |
| 4,216,234 | 8/1980 | Rawlings et al. | 426/2 |
| 4,217,370 | 8/1980 | Rawlings et al. | 426/98 |
| 4,225,620 | 9/1980 | Rawlings et al. | 426/2 |
| 4,248,899 | 2/1981 | Lyon et al. | 426/98 |
| 4,798,737 | 1/1989 | Brunton et al. | 426/602 |
| 4,808,429 | 2/1989 | Freeman | 426/647 |
| 5,093,028 | 3/1992 | Kyogoku et al. | 252/315.1 |
| 5,100,688 | 3/1992 | Cox et al. | 426/573 |

Primary Examiner—Donald E. Czaja
Assistant Examiner—Choon P. Koh
Attorney, Agent, or Firm—Margaret M. Dunbar

[57] ABSTRACT

An improved product and process for protein encapsulation of lipid comprising treating a proteinaceous mixture with an alkali raising the pH to where the proteinaceous mixture is solubilized and will form a gel. With this invention the protein can be solubilized without addition of extraneous water to the process and a reduced requirement for the addition of exogenous chemicals is also accomplished. The optimum pH of solubilization and the optimum pH of encapsulation are determined by titration for each proteinaceous mixture to be used; as they vary depending on the types of proteins. Optimum pH of solubilization is determined as an alkali hydrogen ion difference on a graph in which rate of change in hydrogen ion concentration varies with acid equivalent units. Rate of change of hydrogen ion difference is measured and when the slope of the titration curve is essentially zero, then addition of alkali is ceased. Optimum pH of encapsulation is determined as an acid hydrogen ion difference on a graph in which rate of change in hydrogen ion concentration varies with acid equivalent units. Rate of change of hydrogen ion difference is measured and when the slope of the titration curve is essentially zero, then addition of acid is ceased. The best capsules will be created in a range at or below the pH of encapsulation, but using less than the amount of acid which would partially or completely break down the primary structure of the protein.

9 Claims, 10 Drawing Sheets

Fig. 7 Trout (Whole Fish) Titration Curve

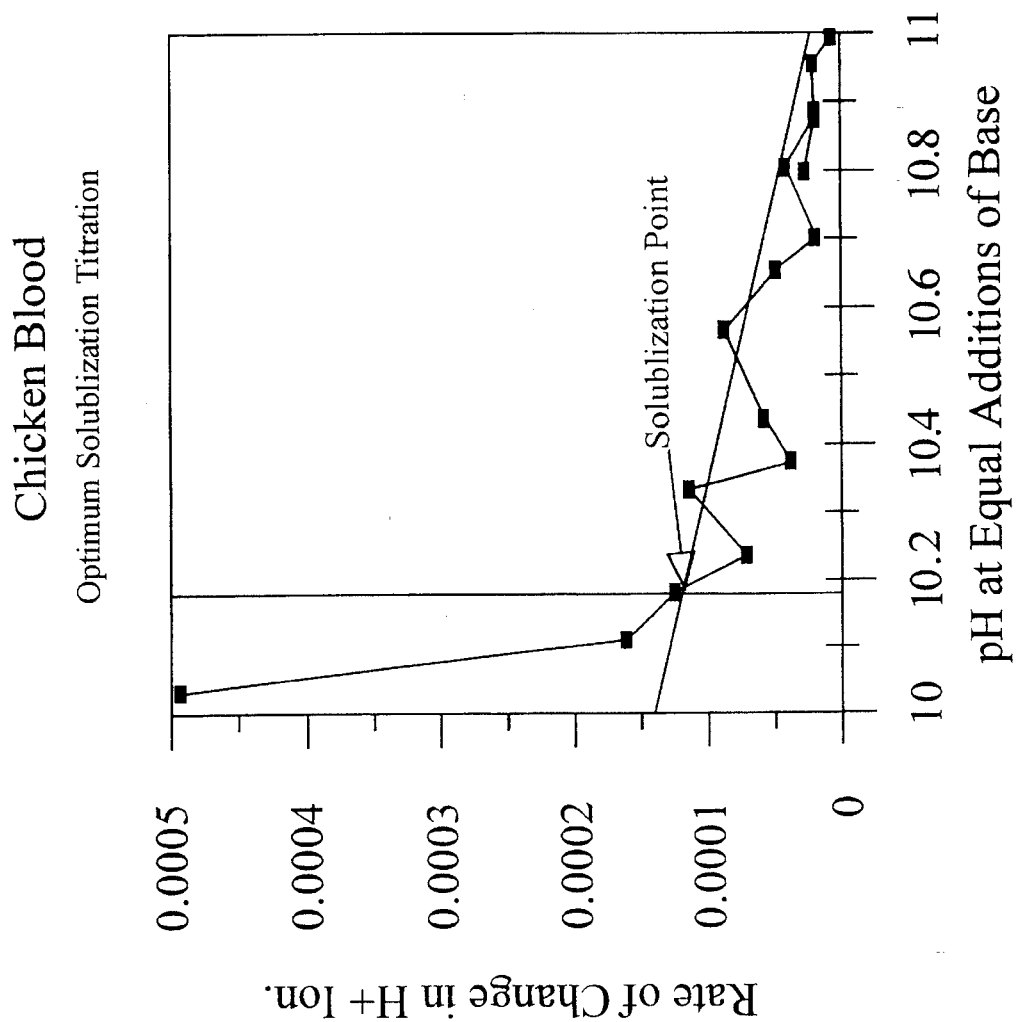

ENCAPSULATED LIPID-CONTAINING FEED

BACKGROUND OF THE INVENTION

1. Technical Field.

This invention relates to an improved encapsulated lipid animal feed and the process for producing such feed in a commercially viable manner. One aspect of this invention relates to the composition of animal feeds produced by using plant and animal proteins, including but not limited to animal blood, fish protein, microbes such as algae, and abattoir waste-stream proteins. Another aspect of this invention relates to the method of precisely manipulating pH levels to optimize capsule strength and durability and minimize the quantity of exogenous chemical use. A final aspect is the method for shearing and mixing the ingredients in such a way that no air is entrained in the emulsion and complete shearing occurs allowing complete encapsulation of the lipid materials so as to enable large-scale commercial production that is economically practical.

2. Related Art.

The benefits of using protein-encapsulated lipid material in the production of animal feeds are well documented. In its dry form, the encapsulated lipid can be easily handled and packaged and, in the case of ruminant animals, it can pass through the rumen and be digested within the abomasum and lower gut of the animal. A number of patents have been issued on methods to achieve such encapsulation, for example, in U.S. Pat. Nos. 4,042,718; 4,138,505; 4,217,370; 4,225,620; 4,808,429; and 4,824,679. However, in the resulting mixtures using these disclosed methods, wherein agents are added to solubilize the proteinaceous material and to subsequently adjust the pH downward, the methods produce entrainment of air and incomplete shearing during the production of the emulsion. Entrainment of air promotes rancidity, fragile capsules and degradation of the encapsulated product. Additionally, the methods discussed above require large quantities of exogenous chemicals to accomplish the encapsulation. Consequently successful commercialization of the general encapsulation techniques covered by the above-listed patents has not been widely accomplished.

In Rawlings et al., U.S. Pat. No. 4,217,370 there is described a process which involves forming an emulsion of globules of nutrient lipid with an aqueous proteinaceous medium (e.g. blood) at a pH of between 9.0 and 13.0 and thereafter lowering the pH of the emulsion to its isoelectric point so as to aggregate the protein and simultaneously microencapsulate the lipid.

I have found that not all pH levels in the 9.0 to 13.0 range produce a strong capsule, nor does lowering the pH only to its isoelectric point. In some instances pH levels in the 9.0 to 13.0 range partially or completely break down the primary structure of the protein, making it impossible to achieve successful encapsulation of the lipid.

Further, the mixing devices prescribed in that patent entrain air in the mixture and are unable to produce a good dispersion/emulsion of lipid material within the rapidly-gelling alkaline blood. The Rawlings process also requires the addition of significant amounts of water to solubilize the protein. This additional quantity of water makes the encapsulated product both difficult and not economical to dry. The resulting product, when dried, exhibits poor physical protection of the lipid material. If the emulsion is allowed to set to let the air escape before the addition of acid or other protein denaturing agent, then the droplets join together and the lipid separates from the protein. Large droplets formed under these conditions are fragile and break down easily during storage and drying, which makes an inferior quality and commercially impractical product.

Well-known methods are described in the literature indicating the use of alkalis and acids to modify the secondary and tertiary structures of proteins without hydrolyzing the primary or peptide bond. As the pH approaches the isoelectric point of the protein, it will "clump" or fold up in a denatured state. Also, it is common knowledge that proteins are made of amino acids of which some are hydrophobic and some are hydrophilic. If protein in a lipid/water mixture is treated with an amount of base necessary to break down the secondary and tertiary structure of the protein but not with an amount which will break the primary links between the amino acids (i.e., the backbone of the protein or peptide bonds), then the hydrophobic amino acid side chains can orientate toward the lipid phase and the hydrophilic side chains can orientate toward the aqueous phase.

A stable capsule depends upon the formation of lipid droplets surrounded by protein in a manner in which hydrophilic amino acids are associated with water and hydrophobic amino acids are associated with lipid. The smaller the droplets, the more effective the encapsulation by the proteinaceous mixture. The mixture containing the lipid and alkali-treated protein requires shearing without the entrainment of air to produce droplets of a size which will be stable when the protein is denatured around the lipid. What is still needed is a method allowing formation of a stable capsule with good protection of the lipid material utilizing the least amount of exogenous chemicals.

Accordingly, it is an object of this invention to provide a process by which lipid material can be encapsulated by a protein material without entrainment of air into the dispersion by use of an in-line mixer in the process.

It is also an object of this invention to provide a process that allows determination of the best pH to provide a strong capsule and to minimize exogenous chemical use in the process.

It is another object of this invention to provide a process which allows addition of base during the process in a smooth, controlled and defined fashion allowing protein to denature without destroying the primary structure of the protein, specific for any selected protein source.

It is a further object of this invention to provide a process which allows addition of acid during the process in a smooth, controlled and defined fashion allowing protein to denature around lipid droplets while the droplets are still small and uniform in size, thereby improving the quality, stability and durability of the capsule and the final product.

DISCLOSURE OF INVENTION

According to the invention, an improved process for producing nutrient compositions derived from a proteinaceous mixture is provided, which comprises treating the proteinaceous mixture with an alkali, such as calcium hydroxide or other alkali, causing the pH to be raised to a range where the proteinaceous mixture is solubilized and will form a gel. An unexpected result of the improved process of this invention is that the protein can be solubilized without the addition of extraneous water to the process. Another unexpected result of the improved process of this invention is the reduced quantity of exogenous chemicals required for the improved encapsulation of the lipid. The proteinaceous mixture can originate from any desired protein source for example: plant and/or animal proteins, including but not limited to animal blood, fish protein, microbes such as algae, and abattoir waste-stream proteins. With this improved process of encapsulating lipid with a protein, a uniform product with superior encapsulation can be achieved; regardless of the protein source selected for the starting material.

Many starting protein sources will inherently contain undesirable solids, for example abattoir waste stream proteins are likely to contain ungular parts. During solubilization crude grinding can be utilized to reduce the size of the undesirable solids. The grinding can best be accomplished using any conventional chopping trash pump, such as the "Parma Chopper Pump" made by Parma Co. In the case of starting protein sources such as blood or other protein sources in which the particle size of undesirable solids are initially small enough to pass through a pump, the chopping trash pump is not necessary. In the case of processing materials such as fish waste, the chopping pump will break the undesirable solids up to the point where they can be pumped.

The optimum pH of solubilization is determined by titration for each proteinaceous mixture to be used; as the solubilization pH range varies depending on protein type. In general, these titrations are determined with samples of the target proteinaceous material and measured in the laboratory to determine the optimum pH of solubilization. The pH points are then used during commercial production. Optimum pH of solubilization is determined as an alkali hydrogen ion difference on a graph in which rate of change in hydrogen ion concentration varies with acid equivalent units.

The proteinaceous mixture is titrated with an alkali. Rate of change of hydrogen ion difference is measured and when the slope of the titration curve is essentially zero, then addition of alkali is ceased. The term "acid equivalent units" means the base addition data is corrected to the acid unit and the term "base equivalent units" means the acid addition data is corrected to the base unit. The term "alkali hydrogen ion difference" means the absolute difference in hydrogen ion concentration per base equivalent unit. The term "acid hydrogen ion difference" means the absolute difference in hydrogen ion concentration per acid equivalent unit.

The solubilization is accomplished by introducing the alkali source into a tank in which the temperature is being controlled via a water jacket on the tank or other suitable means. The water jacket is designed with internal baffles to insure uniform heating of the tank. The proteinaceous mixture is continuously recirculated through the tank. The proteinaceous mixture is maintained at a temperature above the melting point of the lipid to be used, optimum temperature is between about 50° to 55° C., and lipid to be encapsulated is added. Lipid may be added before, during or following solubilization. If the lipid is added following solubilization, then any drop in pH due to free fatty acids is corrected at least back to the optimum pH of solubilization.

Following solubilization the protein/lipid blend is filtered, using any effective standard filtering method. Examples of standard filtering methods that can be used include pumping past a conventional screening device such as vibrating screens, rotating screens, or cloth filters. Other than purified proteins and/or lipids, most protein/lipid streams will contain undesirable solid materials, including but not limited to dirt, rocks, glass, metal, hair, bone, feathers, plant fiber, etc.

Filtering allows the removal of undesirable solid materials and difficult to solubilize protein sources, for example hair, feathers, horn or hoofs. Additionally, filtering allows the removal of undesirable fibrous materials from plant sources of protein, allowing concentration of the protein. If the fibrous materials are not filtered out of the mixture prior to encapsulation the fibers will be included in the encapsulation and provide a source of physical and mechanical obstruction, preventing good encapsulation of the lipid by the solubilized proteinaceous mixture. To be effective the filtering must remove any materials which would not pass the shearing and mixing device and would contaminate the final product.

The filtered and solubilized protein/lipid blend is pumped into the cone bottom tank surrounded by a hot water jacket. The cone of the tank is not jacketed to prevent excessive heating and possible charring of the tank contents. The bottom of the cone is designed in a manner to insure a continuous supply of the thick gelled product to the inlet side of the pump. The proteinaceous mixture/lipid blend is pumped past a uniquely designed shearing and mixing device called a HydraShear, made by KTH Technologies, Caldwell, Idaho. The pump must deliver the material to the HydraShear or other shearing device with a line pressure above 25 psi., preferably in the range of 60 to 150 psi. The discharge of the pump is plumbed to the HydraShear and immediately following the HydraShear an in-line injector is used to add acid, to adjust the pH to the pH of encapsulation or lower.

Optimum pH of encapsulation is determined by titration for each proteinaceous mixture to be used; as the encapsulation pH range varies depending on the types of proteins. In general, these titrations are determined with samples of the target proteinaceous material and measured in the laboratory to determine the optimum pH of encapsulation. The pH points are then used during commercial production. Optimum pH of encapsulation is determined as an acid hydrogen ion difference on a graph in which rate of change in hydrogen ion concentration varies with acid equivalent units. The proteinaceous mixture is titrated with acid. Rate of change of hydrogen ion difference is measured and when the slope of the titration curve is essentially zero, then addition of acid is ceased. The best capsules will be created in a range at or below the pH of encapsulation, but using less than the amount of acid which would partially or completely break down the primary structure of the protein. This pH range inhibits growth of bacteria and other harmful microorganisms and results in a dry encapsulated lipid, safe for use as an animal feed.

The plumbing returns the product to the tank and discharges it in the lower portion of the tank through mixing nozzles or preferably mixing eductors. The mixing eductors are arranged in a manner which maximizes mixing while preventing the entrainment of air. When the product is encapsulated it is diverted to a dryer or to intermediate storage before drying.

Because the improved process of this invention does not require the addition of extraneous water to solubilize the protein, the encapsulated lipid can be dried more rapidly and much more economically than the products produced by other encapsulation processes. Additionally, the improved process of this invention allows the optimum pH for encapsulation to be attained with minimum exogenous chemical use. This results in a product with a better encapsulation that is also more commercially desirable because it is economical to produce.

BRIEF DESCRIPTION OF THE DRAWINGS

FIG. 10 is data from example 3 plotted in the format of a compound graph.

BEST MODE FOR CARRYING OUT THE INVENTION

Figure 1:
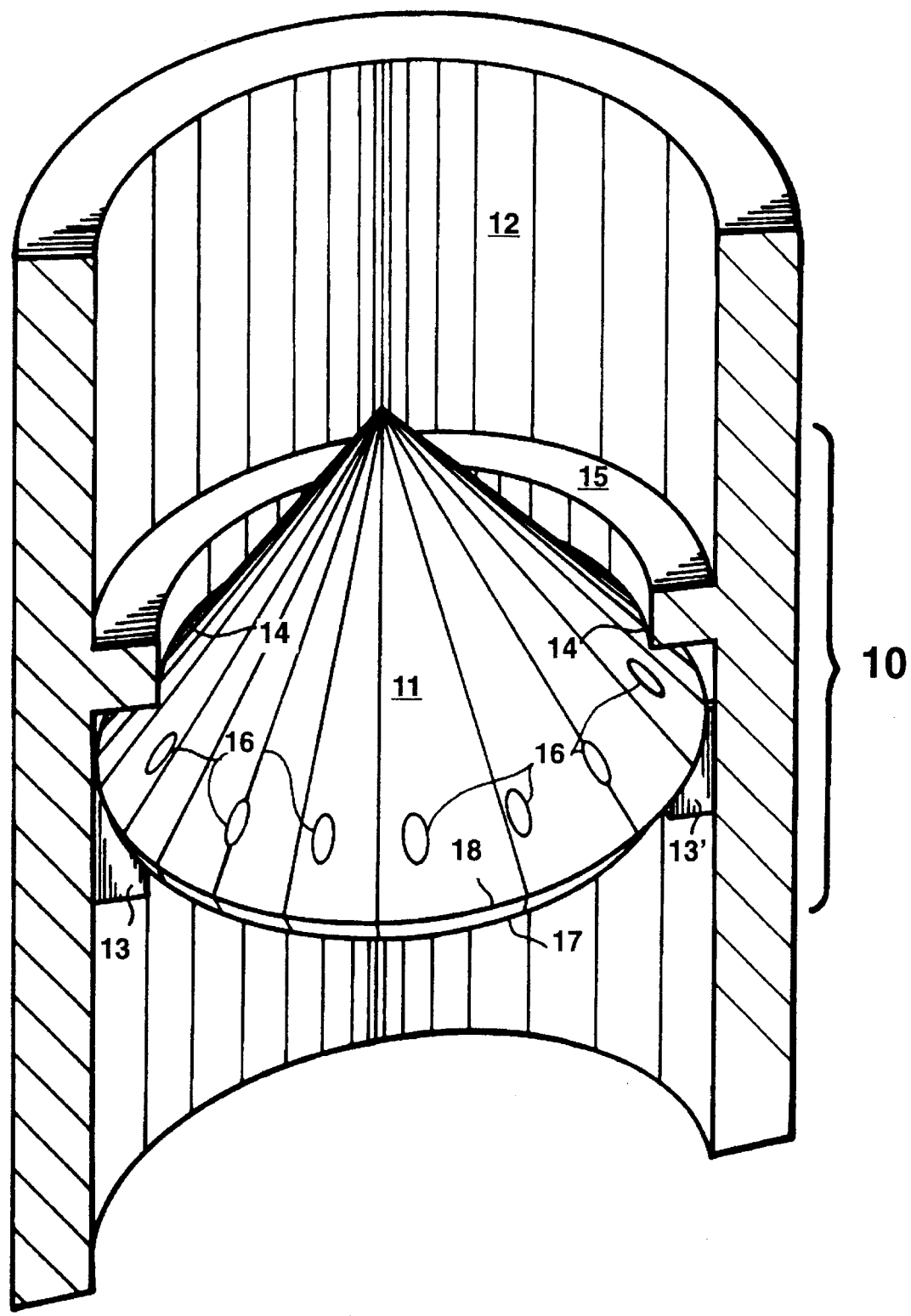
FIG. 1 is an isometric, partial cross-sectional view of one embodiment of the mixing device used in the present invention.

In the preferred embodiment of this invention lipid encapsulated nutrient compositions derived from a proteinaceous mixture are produced by an improved process. The process comprises treating the proteinaceous mixture with an alkali, for example, calcium hydroxide or other alkali; causing the pH to be raised to a range where the proteinaceous mixture is solubilized and will form a gel. The optimum pH of solubilization is determined by titration for the selected proteinaceous mixture. In general, these titrations are determined with samples of the target proteinaceous material and measured in the laboratory to determine the optimum pH of solubilization. The pH points are then used during commercial production. Optimum pH of solubilization is determined as an alkali hydrogen ion difference on a graph in which rate of change in hydrogen ion concentration varies with acid equivalent units.

Turning now to the protein source. The proteinaceous mixture can originate from any desired protein source for example: plant and/or animal proteins, including but not limited to animal blood, fish protein, microbes such as algae, and abattoir waste-stream proteins. With this improved process of encapsulating lipid with a protein, a uniform product with superior encapsulation can be achieved; regardless of the protein source selected for the starting material.

The starting protein source is processed, if necessary, through any conventional chopping trash pump, such as the "Parma Chopper Pump" made by Parma Co. Many starting protein sources will inherently contain undesirable solids, for example abattoir waste stream proteins are likely to contain ungular parts. During solubilization crude grinding can be utilized to reduce the size of the undesirable solids. In the case of starting protein sources such as blood or other protein sources in which the particle size of undesirable solids are initially small enough to pass through a pump, the chopping trash pump is not necessary.

The proteinaceous mixture is titrated with an alkali, preferably calcium hydroxide. Optimum pH of solubilization is determined from the rate of change in hydrogen ion concentration which occurs per uniform unit of base addition to water based proteinaceous mixture. The pH at each addition is measured upon reaching stabilization of pH meter reading. Rate of change of hydrogen ion difference is measured and when the slope of the titration curve is essentially zero, then addition of alkali is ceased.

Turning now to the solubilization, the solubilization is accomplished in the preferred embodiment by introducing the alkali source into a cone bottom tank in which the temperature is being controlled via a water jacket on the tank or other suitable means. The water jacket is designed with internal baffles to insure uniform heating of the tank. The proteinaceous mixture is continuously recirculated through the tank. The proteinaceous mixture is maintained at a temperature above the melting point of the lipid to be used, optimum temperature is between about 50° to 55° C., and lipid to be encapsulated is added. Better capsules are formed when lipids with low free fatty acid content are used. Following solubilization the protein/lipid blend is filtered, preferably using rotating screens, however any effective standard filtering method can be used. Examples of standard filtering methods that can be used include pumping past a conventional screening device such as vibrating screens, rotating screens, or cloth filters. With the exception of purified proteins and/or lipids, most protein/lipid streams will contain undesirable solid materials including but not limited to dirt, rocks, glass, metal, hair, bone, feathers, plant fiber, etc.

Filtering allows the removal of undesirable solid materials and difficult to solubilize protein sources, for example hair, feathers, horn or hoofs. Additionally, filtering allows the removal of undesirable fibrous materials from plant sources of protein, allowing concentration of the protein. If the fibrous materials are not filtered out of the mixture prior to encapsulation the fibers will be included in the encapsulation and provide a source of physical and mechanical obstruction, preventing good encapsulation of the lipid by the solubilized proteinaceous mixture. To be effective the filtering must remove any materials which would not pass through the shearing and mixing device and would contaminate the final product.

Turning now to the encapsulation, the filtered and solubilized protein/lipid blend is pumped into the cone bottom tank surrounded by a hot water jacket. The cone of the tank is not jacketed to prevent excessive heating and possible charring of the tank contents. The bottom of the cone is designed in a manner to insure a continuous supply of the thick-gelled product to the inlet side of the pump.

The proteinaceous mixture/lipid blend is pumped past a uniquely designed shearing and mixing device called a HydraShear, made by KTH Technologies, Caldwell, Idaho. The filtered and solubilized protein/lipid blend is pumped into the cone bottom tank. The bottom of the cone bottom tank is designed in a manner to insure a continuous supply of the thick gelled product to the inlet side of the pump.

The HydraShear causes formation of lipid droplets surrounded by protein. The design of the HydraShear allows formation of the protein/lipid emulsion without the entrainment of air, and in a manner such that protein/lipid droplet size is very small. The equipment also allows the addition of acids or other denaturants without the entrainment of air, before lipid droplets can reform into increasingly larger droplets. Some heat is generated due to friction from pumping the material past the HydraShear. Other mixers which allow formation of protein/lipid emulsions without entrainment of air and in a manner such that protein/lipid droplet size is very small can also be used.

The pump must deliver the material to the HydraShear or other shearing device with a line pressure above 25 psi., preferably in the range of 60 to 150 psi. The discharge of the pump is plumbed to the HydraShear and immediately following the HydraShear an in-line injector is used to add acid, to adjust the pH to the pH of encapsulation or lower.

The next step in formation of a stable capsule is the addition of acid to lower the pH of the protein/lipid emulsion below the isoelectric point of the proteins. Acid must be added while the mixture is being processed by the HydraShear. Acid must be added in a smooth and controlled manner to ensure lipid droplets of small size and uniform encasing with protein as the pH is lowered. In the preferred embodiment the acid is injected into the center of the fluid stream immediately post-shearing, preferably in the center of the pipe that terminates with the mixing eductors. To accomplish the addition of the acid in a smooth manner in the preferred embodiment, the acid is added using a mixer with substantially propeller-shaped blades. Any device that produces gentle fluid turbulence at the point of addition will accomplish the smooth addition of the acid.

Turning now to the acid, phosphoric acid is used in the preferred embodiment, but any acid may be used, for example, phosphoric, hydrochloric, sulfuric, formic, acetic or propionic acid may be used. To determine the correct ending pH, the proteinaceous mixture is titrated with the acid to be used and the optimum range is determined. Optimum pH of encapsulation is determined from the rate of change in hydrogen ion concentration which occurs per uniform unit of acid addition to water based proteinaceous mixture. The pH at each addition is measured upon reaching stabilization of pH meter reading. The best capsules will be created in a range at or below the pH of encapsulation, depending on use and storage time of the final product. Optimum pH of encapsulation is determined as an acid hydrogen ion difference on a graph in which rate of change in hydrogen ion concentration varies with acid equivalent units. The proteinaceous/lipid emulsion is titrated with acid. Rate of change of hydrogen ion difference is measured and when the slope of the titration curve is essentially zero, then addition of acid is ceased.

This pH range at or below the pH of encapsulation inhibits the growth of bacteria and other harmful microorganisms and results in a dry encapsulated lipid that incorporates reduced quantities of exogenous chemicals and is safe for use as an animal feed, through improved capsule integrity and durability.

The selection of one or a mixture of the hydroxides of calcium, magnesium, sodium and potassium and/or the carbonates of sodium and potassium provide(s) the alkali and allow(s) control of the amount and ratios of the cations found in the finished product. The selection of one or a mixture of acids used to lower the pH allow(s) control of the ratios and amounts of phosphate, chloride and sulfate, the ratios and amounts of anions from the strong acids (phosphoric, hydrochloric and sulfuric) and from the weak acids (formic, acetic and propionic) and the ratios and amounts of formic, acetic and propionic in the finished product.

By the proper selection of the alkali(s) and acid(s) used, the nutritional and electrolyte value of the finished product can be modified. Weak acids also provide additional antimicrobial protection. Fat soluble nutrients, such as vitamins, can be included during the encapsulation process. Fats susceptible to oxidation should ideally include an antioxidant, for example vitamin E or ethoxyquin before encapsulation.

Turning now to the encapsulated product, the plumbing returns the product to the tank and discharges it in the lower portion of the tank through mixing nozzles or preferably mixing eductors. The mixing eductors are arranged in a manner which maximizes mixing while preventing the entrainment of air. When the product is encapsulated it is diverted to a dryer or to intermediate storage before drying.

Any conventional drying means can be utilized to dry the encapsulated lipid. Examples of drying means used with the preferred embodiment of this invention include spray dryers and rotary-drum dryers.

Because the improved process of this invention does not require the addition of extraneous water to solubilize the protein, the encapsulated lipid can be dried more rapidly and much more economically than the products produced by other encapsulation processes. Additionally, the improved process of this invention allows the optimum pH for encapsulation to be attained with minimum exogenous chemical use. This results in a product with a better encapsulation that is also more commercially desirable because it is economical to produce.

Figure 2:
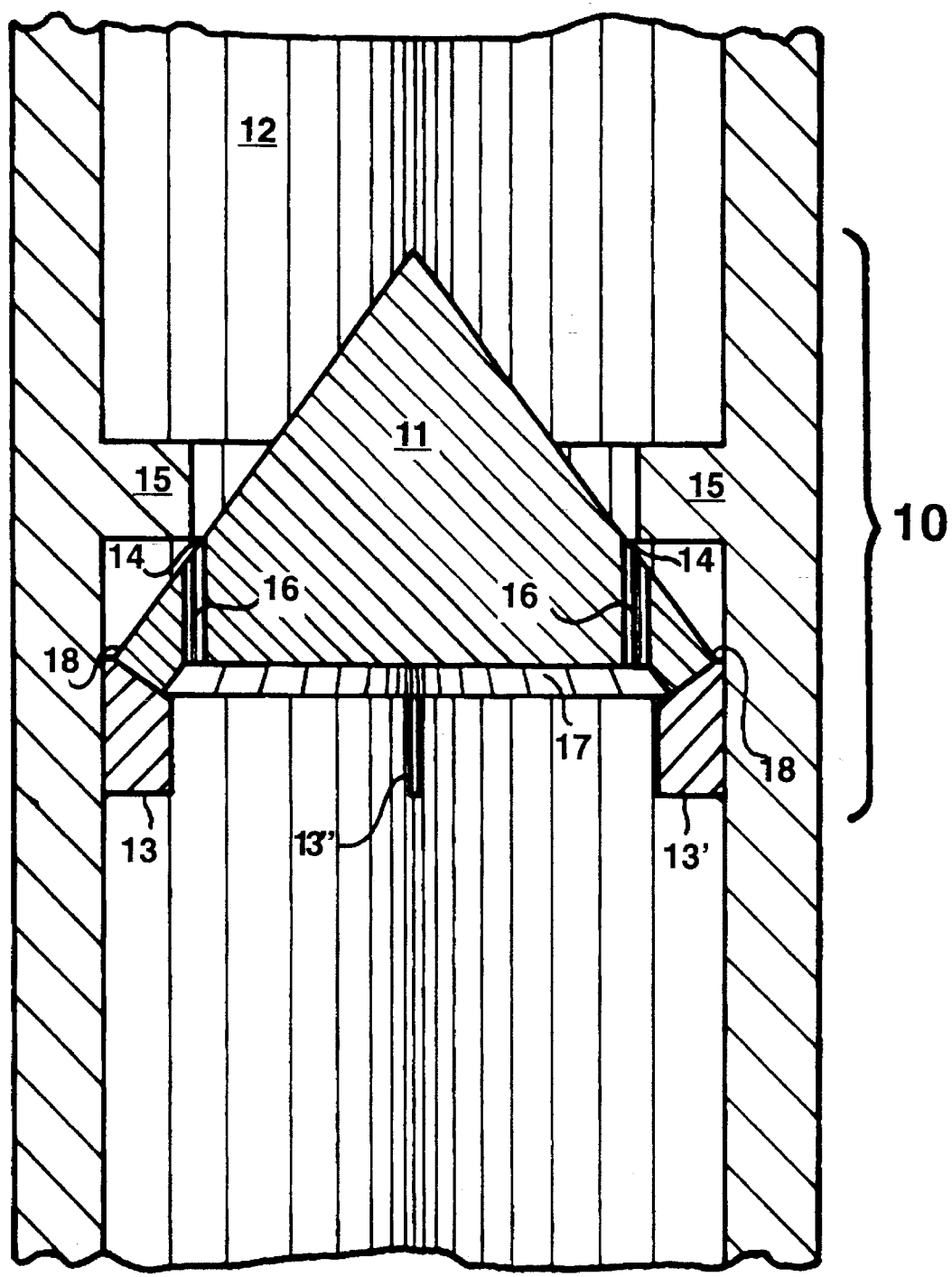
FIG. 2 is a side, cross-sectional view of the embodiment depicted in FIG. 1.
Figure 3:
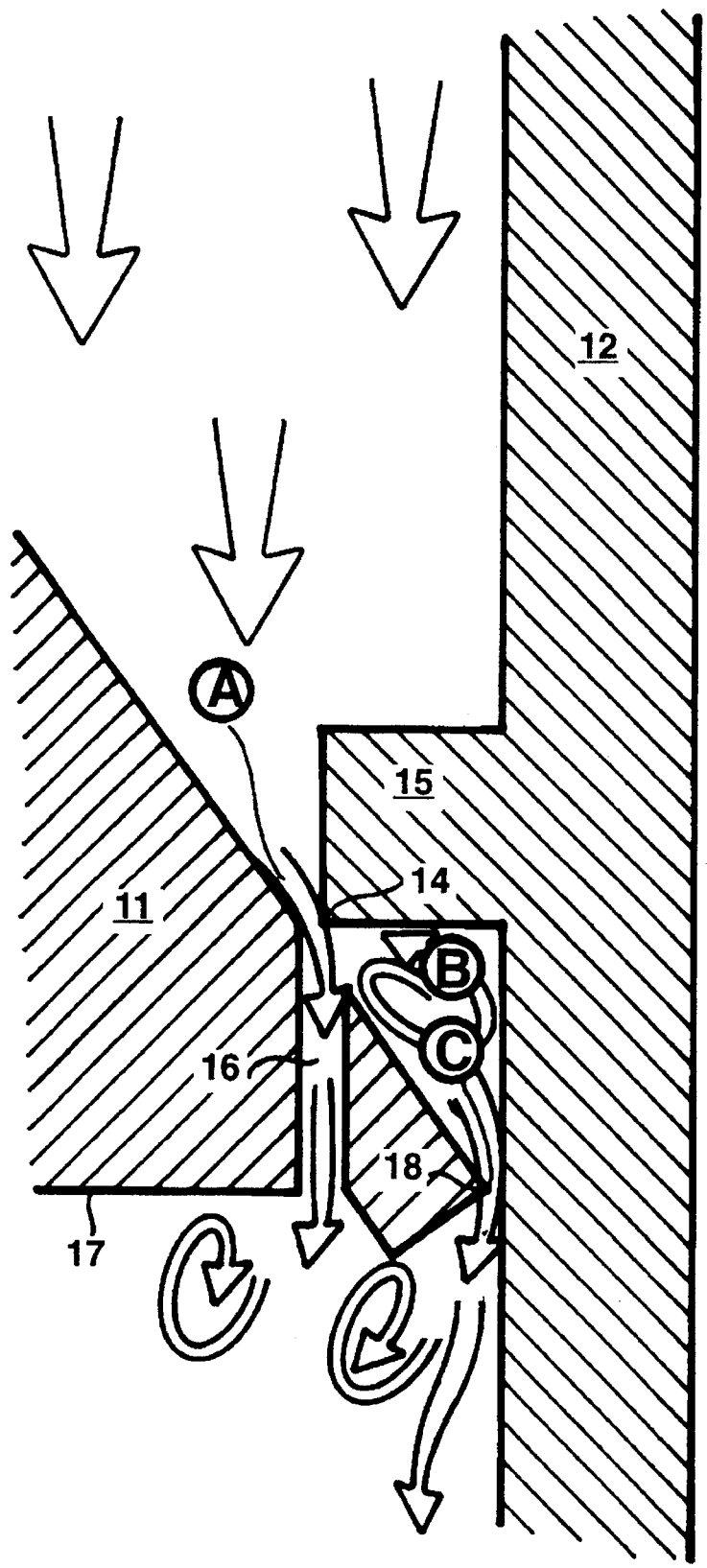
FIG. 3 is a schematic, partial, cross-sectional view of the embodiment depicted in FIGS. 1 and 2.

Turning now to the HydraShear mixer and referring to FIGS. 1–3, there is depicted generally at 10 one embodiment of the in-line mixer of this invention. Mixer 10 has conical shear head 11 centered within pipe 12. The pointed end of shear head 11 is directed upstream relative to the flow of fluid through pipe 12. Shear head 11 is welded to lugs 13, 13' and 13" on the inside surface of the pipe 12 in order to hold shear head 11 securely within the pipe 12. Slightly upstream of lugs 13, 13' and 13" is annular ring 15 on the inside surface of pipe 12. Ring 15 has a sharp, downstream inner edge 14. Shear head 11 is positioned so that the surface of its upstream, slanted face is very close to the downstream, inner edge 14 of annular seating ring 15.

The upstream side of annular seating ring 15 may be a smooth, tapered transition from the inside surface of pipe 12 to the upstream, inner edge of the ring. This way, pressure drop and residence time for the fluid entering the mixer may be minimized. However, if high pressure drop is not a problem for the particular mixing process, or if it is desired to maximize turbulence and residence time at the entrance to the mixer, a rectangular, annular ring, with sharp upstream and downstream inner edges as depicted in FIGS. 1–3 and 5, may be used.

The slanted face of shear head 11 extends through the center of annular seating ring 15 in the upstream direction, and is positioned to be located very close, about 0.020 inches away to the downstream, inner edge 14 of seating ring 15 when cow blood and fat are being processed by the mixer, for example. This way, a Region A of high shear force is created at the downstream, inner edge 14 of seating ring 15 when fluid in pipe 12 passes between edge 14 and the upstream face of the shear head 11. The size of Region A may be varied by locating the slanted face of shear head 11 nearer to or farther from the downstream, inner edge 14 of seating ring 15. This way, depending upon the composition, viscosity, percent solids, etc. of the liquid being processed by the mixer, efficient mixing may still be obtained by varying the intensity of the shear force in Region A, with more shear force being experienced with the smaller Region A.

In the upstream, slanted face of the shear head 11 there is a series of generally circular ports 16 bored through the shear head generally parallel to the center-line of the seating ring 15 and pipe 12. The ports 16 extend through the shear head 11 from its upstream side to its downstream side, or back, 17. The ports 16, which may number from about five to about twenty, are arranged to be generally evenly-spaced apart at an equal distance from the center-line of the seating ring 15 and pipe 12. Preferably, the center of each port 16 is located so that it is at the same perpendicular Distance B from the inside surface of pipe 12 as the downstream, inner edge 14 of seating ring 15 when cow blood and fat are being processed by the mixer. The Distance B may be varied, and the relative distance of the center of the ports 16 and the distance of the downstream, inner edge 14 may be varied also in order to create more or less turbulence at the inlets to the ports 16, with more turbulence being experienced with the greater relative distance.

At the downstream end of the slanted face of shear head 11 is a first sharp, approximately 90° edge 18 leading away from the inside surface of pipe 12 in the downstream direction. This first sharp edge 18 is adjusted to be located very close, about 0.004 inches when cow fat and blood are being processed by the mixer, to the inside surface of pipe 12. This way, a Region C of high shear force is created at the first sharp edge 18 when fluid passes between this edge of shear head 11 and the inside surface of pipe 12. The size of Region C may be varied by locating the first sharp edge 18 nearer to or farther from the inside surface of pipe 12. This way, depending upon the composition, viscosity, percent solids, etc. of the liquid being processed by the mixer, efficient mixing may still be obtained by varying the intensity of the shear force in Region C, with more shear force being experienced with the smaller Region C.

Also, the ports 16 are sized so that the sum of their cross-sectional area in a plane perpendicular to the center-line of the seating ring 15 and pipe 12 is approximately equal to the area of the annular space, Region C, between the first sharp edge 18 of shear head 11 and the inside surface of pipe 12.

Preferably, the component parts of the mixer of this invention are precision machined to fit and cooperate together exactly. For example, first the inside surface of pipe 12 is machined to ensure that it is perfectly round and of an exact diameter. Then, seating ring 15 is machined to ensure also that it is perfectly round and of an exact diameter. The exact location of seating ring 15 within pipe 12 may be ensured by, for example, machining a circumferential ledge into the inside surface of pipe 12 to act as a stop for seating ring 15.

Then, the exact location of shear head 11 relative to seating ring 15 may be ensured by first tack welding lugs 13, 13' and 13" to shear head 11, and then tack welding the lugs to the inside surface of pipe 12. At this point, care must be exercised to maintain the exact distance between the slanted face of shear head 11 and the downstream, inner edge 14 of seating ring 15, and at the same time the exact distance between first, sharp edge 18 and the inside surface of pipe 12. Similar care must also be exercised in manufacturing the conical shear head 11 and ports 16. This way, the component parts of the mixer will cooperate together to provide the intense shear and mixing forces necessary to make good dispersions.

Generally, high-grade pipe fitting and machining materials and techniques will suffice for manufacturing the mixer of this invention, depending on the intended use of the resulting dispersion. For food grade applications, for example, all of the parts must be stainless steel, and they must be readily disassembled for cleaning. For other industrial applications, carbon steel may suffice. We prefer to use stainless steel materials, for example 316 stainless, schedule 80 pipe for the pipe section 12. Also, depending on the application, we prefer similar materials for the shear head 11 and seating ring 15. These components of the mixer of this invention may be manufactured and assembled by conventional techniques, provided the care described above is given to the methods.

Figure 4:
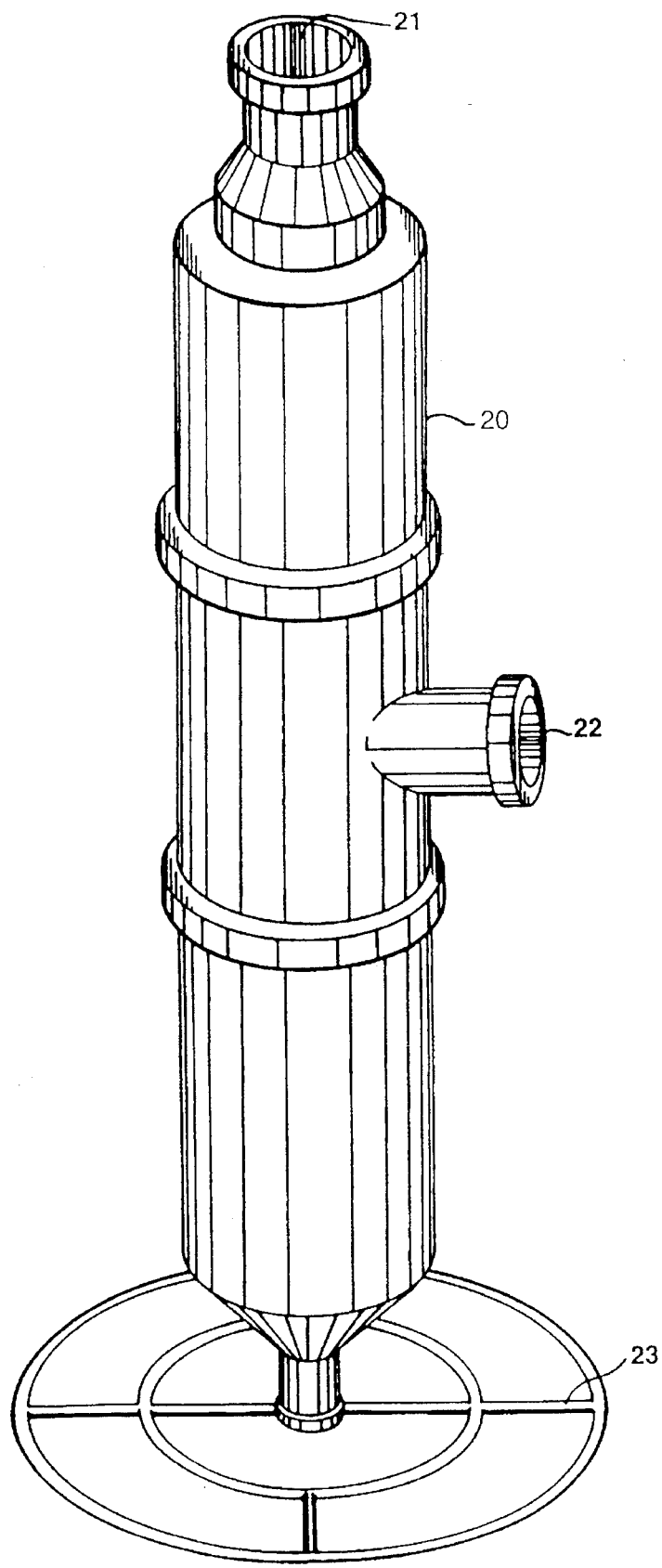
FIG. 4 is an isometric view of another embodiment of the mixing device used in the present invention.
Figure 5:
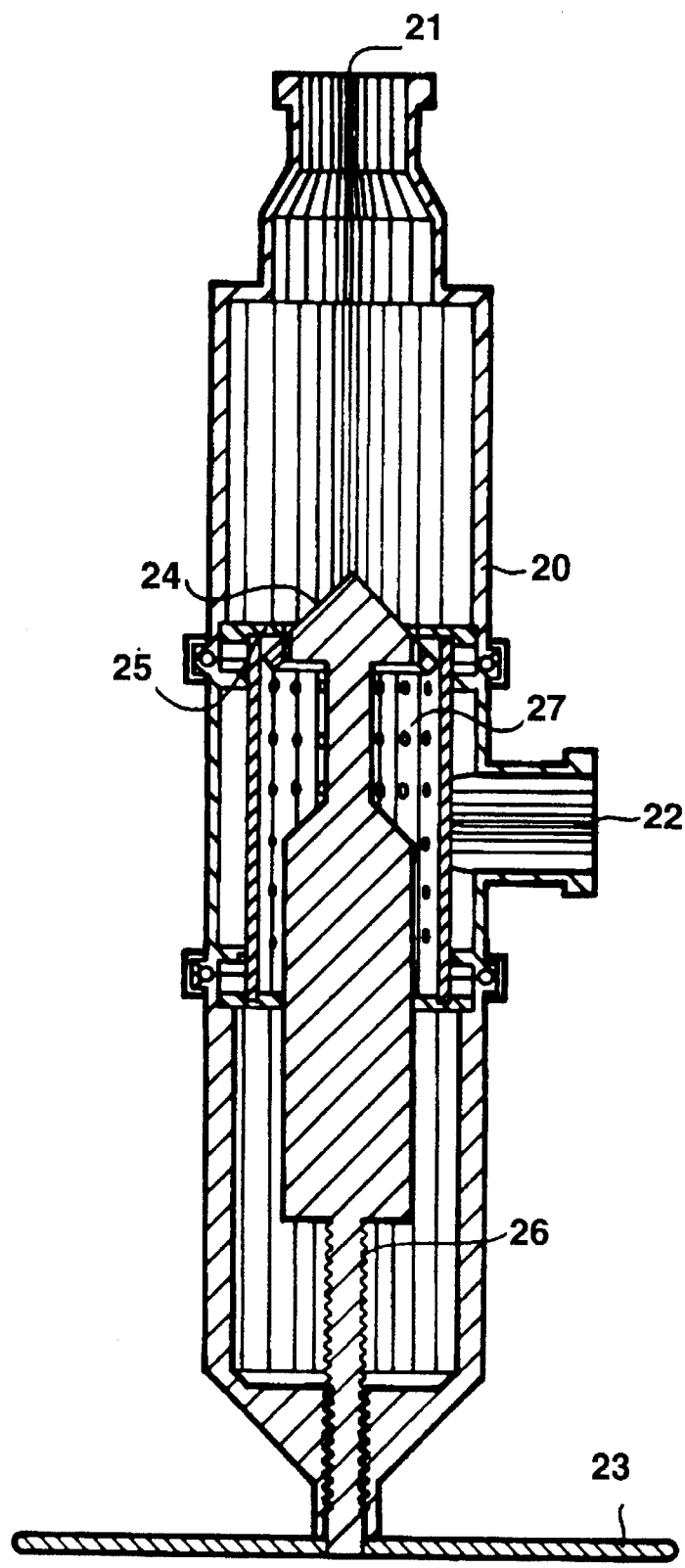
FIG. 5 is a cross-sectional, side view of the embodiment depicted in FIG. 4.
Figure 6:
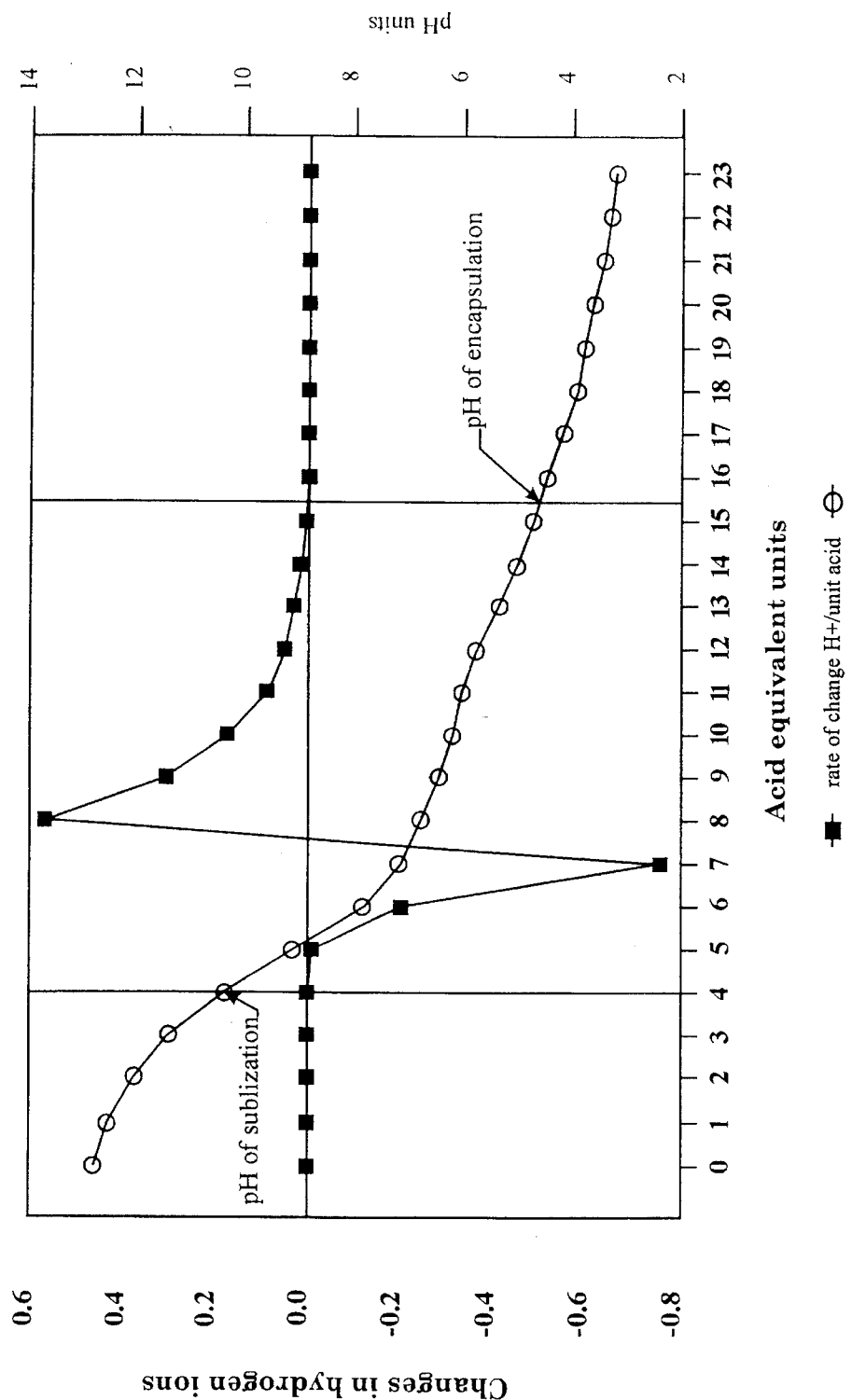
FIG. 6 is data from Example 1 plotted in the format of a compound graph.
Figure 7:
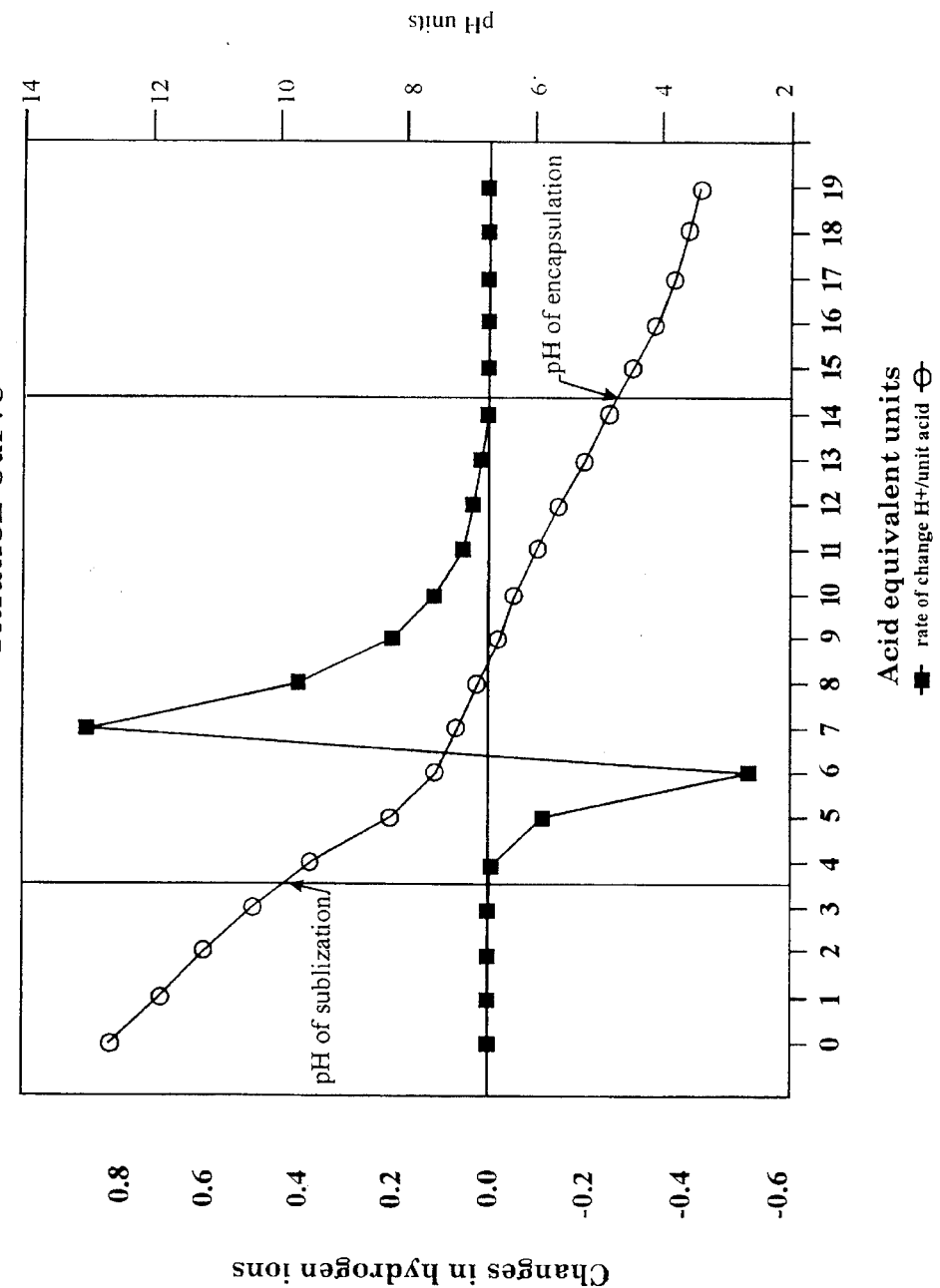
FIG. 7 is also data from Example 1 plotted in the format of a compound graph.
Figure 8:
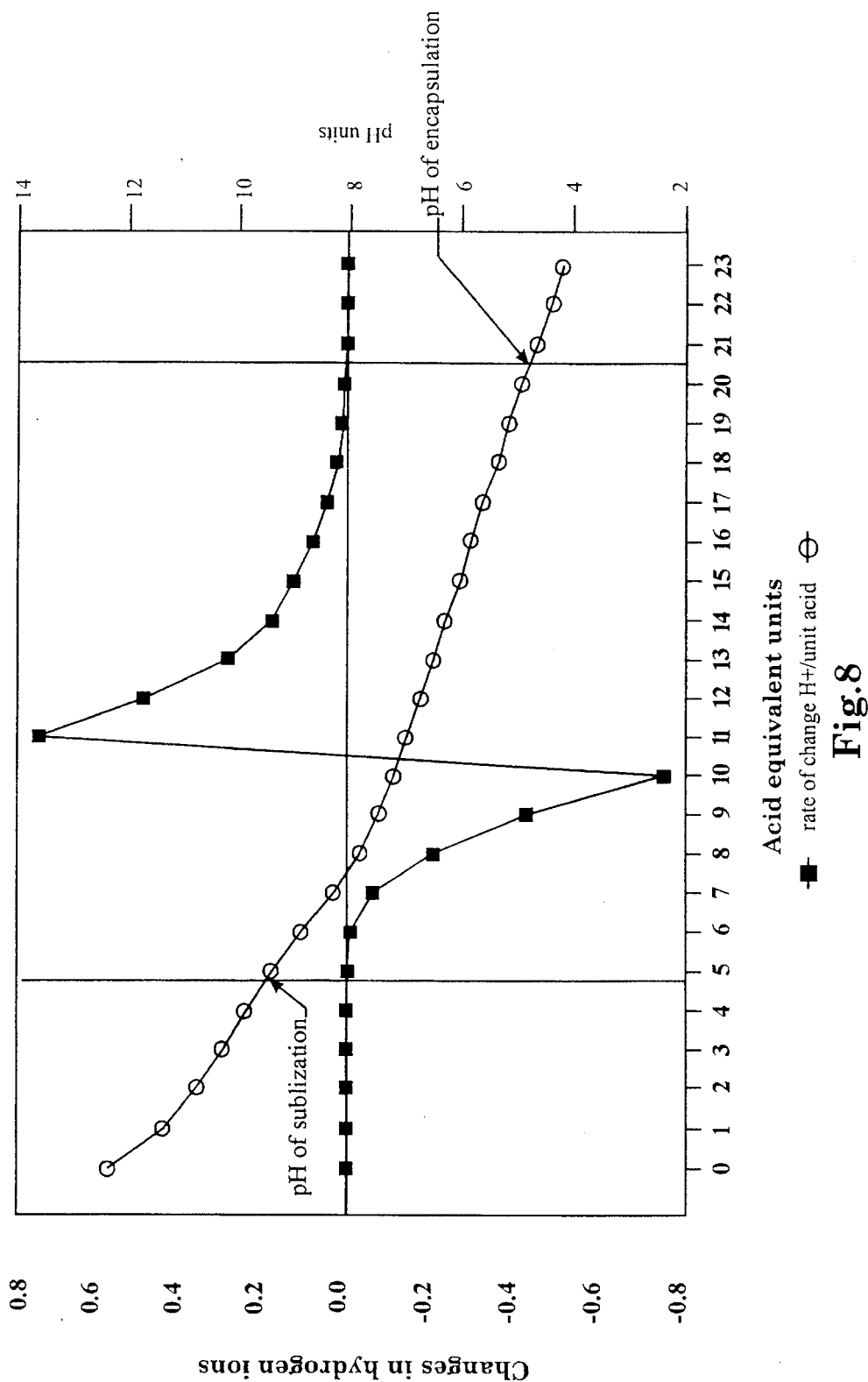
FIG. 8 is data from example 2 plotted in the format of a compound graph.
Figure 9:
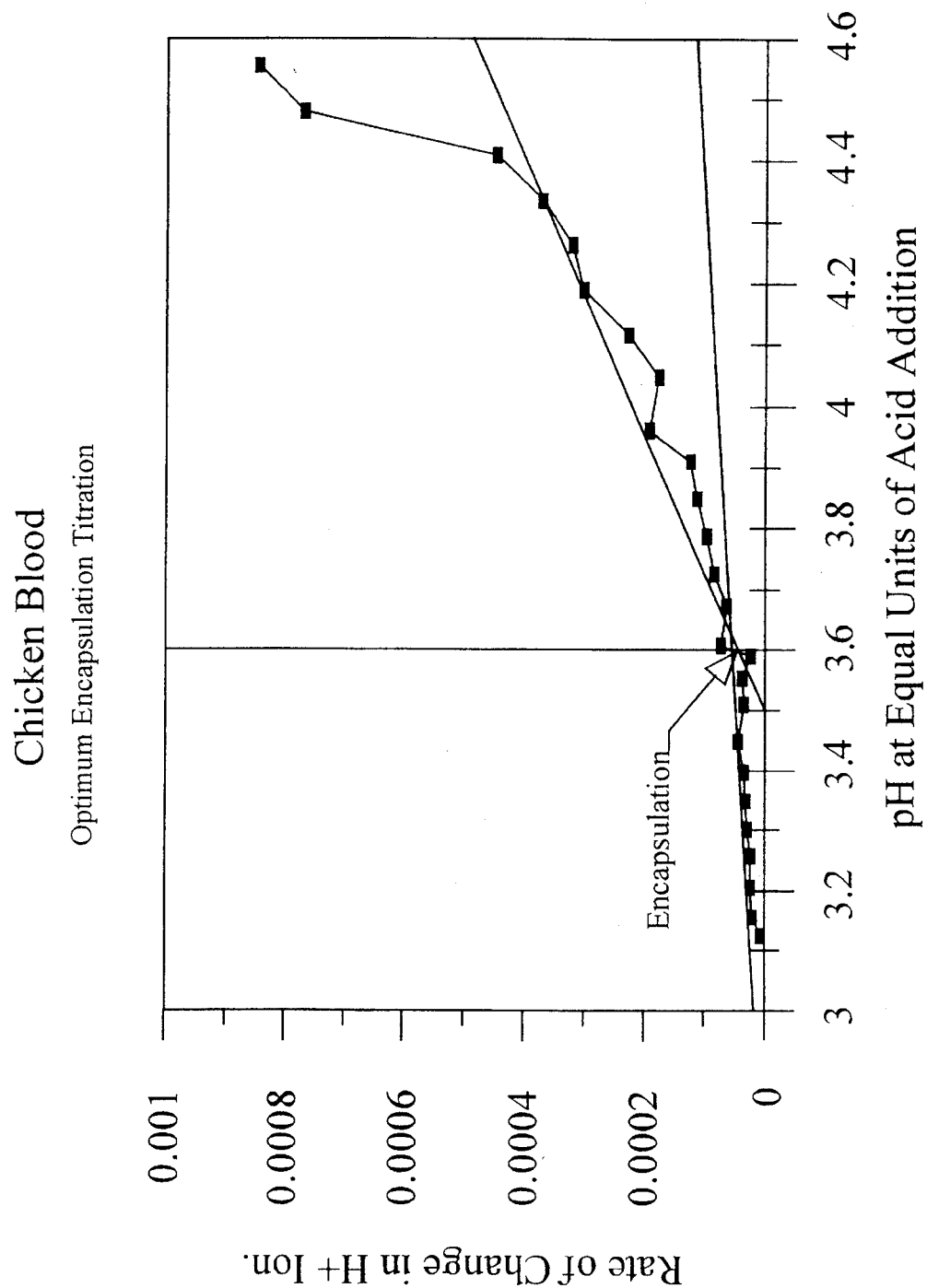
FIG. 9 is data from example 3 plotted in the format of a compound graph.

An alternative embodiment 20 of the mixer of this invention is depicted in FIGS. 4 and 5. This mixer has an inlet section 21 and an outlet section 22. Also, it has an adjustment mechanism 23 for adjusting the distance between the upstream, slanted face of its shear head 24 and its seating ring 25. This way, different liquids may be processed by the mixer, and different Region A's, Distances B and Region C's provided in the mixer, by simply adjusting the travel of shaft 26 connected between adjustment mechanism 23 and shear head 24. Optionally in this embodiment, annular perforated mixing basket 27 may also be used to provide additional mixing of the liquid after it has passed shear head 24 and seating ring 25, or to provide primary mixing if shaft 26 is withdrawn all the way to remove shear head 24 from within seating ring 25.

The following examples serve to better illustrate the improved encapsulation process of this invention.

EXAMPLE 1

A series of experiments were performed with several different materials to determine the minimum pH of solubilization, i.e., the minimum alkali required and the maximum pH of encapsulation, i.e., the minimum amount of acid required for each protein source. It was also determined that pH levels above minimum solubilization points could be used but would lead to increased alkali and acid usage and may partially or completely break down the primary structure of the protein. The pH levels below the maximum pH of encapsulation may be used to control viscosity and/or preservation. The proteins included were beef blood, chicken blood, chicken abattoir effluent, fish components, and corn zein.

The experimental procedure involved grinding between 100 and 500 grams of the protein material in a Waring® blender. Using a standard solution of sodium hydroxide and a semiautomatic delivery device, uniform quantities of base were added during slow blending, and pH measures were recorded after stabilization of meter readings. Using the following graphs of the hydrogen ion difference per unit amount of added alkali for fish protein sources, the minimum pH of solubilization was determined to be at the point where the rate of change of hydrogen ion difference is essentially zero.

A portion of the protein material was taken to pH levels well above solubilization point to determine the full titration curve; that material was subsequently discarded. Using the remaining portion of protein material and a standard solution of phosphoric acid delivered through a semi-automatic device, uniform quantities of acid were added during slow blending, and pH measures were recorded after stabilization of meter readings. Using the following graphs of the hydrogen ion difference per unit amount of added acid for fish protein sources, the optimum pH of encapsulation was determined at the point where the rate of change of hydrogen ion difference is essentially zero. The rate of change in hydrogen ion concentration is determined by converting the pH to hydrogen ion concentration and determining the absolute difference in the concentration from the hydrogen ion concentration determined at the previous base or acid addition. The data in example 1 is plotted in the format of a compound graph showing two lines. One line being the change in hydrogen ion concentration of the mixture versus uniform units of acid or base addition and the second line being the pH of the mixture versus uniform units of acid or base addition.

EXAMPLE 2

The data in example 2 is shown in the same format as example 1. The data is plotted in a compound graph showing two lines. One line being the rate of change in hydrogen ion concentration of the mixture versus uniform units of acid or base addition and the second line being the pH of the mixture versus uniform units of acid or base addition. Two hundred seventy three pounds of fish processing waste containing viscera and skeletons were ground in a standard Hobart mill, with one third of the mixture being ground through a 3/16" orifice plate and the remaining two thirds through a 1/2" orifice plate. The material was heated in a hot water jacketed tank to a temperature of 118° F., and 4.6 lbs. of calcium hydroxide was added to solubilize the proteinaceous material, resulting in an immediate pH of 11.2. After standing for approximately 75 minutes, the pH of the solubilized material was 10.6, which is above the minimum determined in Example 1, ensuring complete solubilization.

The material was then processed through a 20-mesh Sweiko screen to remove the bones and other solids. A quantity of 138 lbs. of the screened material was transferred to a cone-bottom, hot-water-jacketed mixing tank connected to an air-driven diaphragm pump at the cone in such a manner to ensure gelled materials would enter the pump. The material then entered a recirculation loop from the pump back to the tank passing a HydraShear immediately followed by an in-line acid injection port and returning to the mixing tank in a manner ensuring uniform mixing of the tank contents. The material was heated to 127° F., and 2.6 lbs. of sulfuric acid was added using a chemical metering pump to inject the acid into the material flow stream immediately after passing the HydraShear and before returning to the mixing tank. Over a period of 45 minutes, the temperature of the material was gradually raised and held at 140° F. for 15 minutes.

Throughout the acidification process, the mixture was pumped past the HydraShear causing the formation of the lipid droplet surrounded by the protein. Observable changes to the physical characteristics of the material were as follows: at pH 9.4, the ammonia odor created during solubilization had disappeared; at pH 8.6, the material became smooth in texture; at pH 8.0, the material appeared to be at its isoelectric point; at pH 6.7, the material began thickening, reaching maximum thickening at pH 5.6; after pH 5.2 (the point of complete encapsulation as determined in Example 1), the material began thinning; and at pH 5.0, the process was stopped.

The material was pumped onto a moving chain revolving around a propane-fired rotary drum. The dried, finished material was removed from the chain using rotary brushes, resulting in a granular material which was fat free in appearance and to the touch and having a moisture content between 6 to 13 percent by weight.

EXAMPLE 3

Example 3 is graphed in a format where the rate of change in hydrogen ion concentration is plotted against the pH at equal units of acid or base addition. The optimum pH is determined from the point where the slope of the rate of change in hydrogen ion concentration versus uniform units of acid or base addition is essentially zero.

Chicken blood was received cool but thawed from the abattoir. It was refrozen and stored until being thawed for titrations.

A standard base prepared by diluting 10 cc of a 40% sodium hydroxide solution to 2 liters with distilled water was used to determine the solubilization graph data points. A standard acid prepared by diluting 10 cc of reagent grade phosphoric acid to 2 liters with distilled water was used to determine the encapsulation graph data points. The base equivalent unit for the acid and the acid equivalent unit for the base was determined by titration of 50.5 ml of the standard base with 33.0 ml of standard acid to a pH of 7.02.

Solubilization graph data points were determined by weighing 150.7 grams of blood and 150 grams of distilled water into a Waring® blender and titrating the mixture with 5.05 ml additions of standard base. The stabilized pH measures of the titrated mixture were recorded for each uniform 5.05 ml base addition. At each data point the rate of change in hydrogen ion concentration was calculated and recorded. The data points between pH 10 and 11 were graphed as they covered the optimum solubilization point.

Encapsulation graph data points were determined by weighing 150.1 grams of blood and 150.7 grams of distilled water into a Waring® blender and adjusting the pH to a stabilized 10.3 with standard base then titrating the mixture with 5.0 ml additions of standard acid. The stabilized pH measures of the titrated mixture were recorded for each uniform 5.0 ml acid addition. At each data point the rate of change in hydrogen ion concentration was calculated and recorded. The data points between pH 4.6 and 3.0 were graphed as they covered the optimum encapsulation point.

The optimum solubilization point for this sample of chicken blood was determined to be 10.2 pH units and the optimum encapsulation point was determined to be 3.8 pH units.

While there is shown and described the present preferred embodiment of the invention, it is to be distinctly understood that this invention is not limited thereto but may be variously embodied to practice within the scope of the following claims.

What is claimed is:

1. An improved method for encapsulating lipid material in a proteinaceous mixture, the method comprising treating the proteinaceous mixture by adding an alkali such as calcium hydroxide or other alkali to cause the pH of the mixture to be raised to a basic endpoint pH range where proteins in the proteinaceous mixture will be solubilized to form a gel; maintaining the proteinaceous mixture at a temperature above the melting point of a lipid material, optimally in a range between about 50° to 55° C.; adding an amount of lipid material to the alkali-treated proteinaceous mixture to provide a dispersion with a ratio of lipid to proteinaceous mixture in a range from about 20 to 80, respectively; adding an acid to the lipid material/proteinaceous mixture dispersion to cause the pH of the dispersion to be lowered to an acidic endpoint where the proteins in the dispersion will encapsulate the lipid material;

wherein the improvement comprises:
determining an optimum pH of solubilization by titration as an alkali hydrogen ion difference on a hydrogen ion difference curve, measuring rate of change of hydrogen ion difference per unit of acid equivalent, ceasing addition of alkali when the slope of the titration curve is essentially zero.

2. An improved method for encapsulating lipid material in a proteinaceous mixture, the method comprising treating the proteinaceous mixture by adding an alkali such as calcium hydroxide or other alkali to cause the pH of the mixture to be raised to a basic endpoint pH range where proteins in the proteinaceous mixture will be solubilized to form a gel; maintaining the proteinaceous mixture at a temperature above the melting point of a lipid material, optimally in a range between about 50° to 55° C.; adding an amount of lipid material to the alkali-treated proteinaceous mixture to provide a dispersion with a ratio of lipid to proteinaceous mixture in a range from about 20 to 80, respectively; adding an acid to the lipid material/proteinaceous mixture dispersion to cause the pH of the dispersion to be lowered to an acidic endpoint where the proteins in the dispersion will encapsulate the lipid material;

wherein the improvement comprises:
passing the lipid material/proteinaceous mixture dispersion through a fixed mixing means which causes the formation of lipid droplets encapsulated by protein without the entrainment of air into said dispersion or said lipid droplets.

3. An improved method for encapsulating lipid material in a proteinaceous mixture, the method comprising treating the proteinaceous mixture by adding an alkali such as calcium hydroxide or other alkali to cause the pH of the mixture to be raised to a basic endpoint pH range where proteins in the proteinaceous mixture will be solubilized to form a gel; maintaining the proteinaceous mixture at a temperature above the melting point of a lipid material, optimally in a range between about 50° to 55° C.; adding an amount of lipid material to the alkali-treated proteinaceous mixture to provide a dispersion with a ratio of lipid to proteinaceous mixture in a range from about 20 to 80, respectively; adding an acid to the lipid material/proteinaceous mixture dispersion to cause the pH of the dispersion to be lowered to an acidic endpoint where the proteins in the dispersion will encapsulate the lipid material;

wherein the improvement comprises:
determining a pH of encapsulation by titration as an acidic hydrogen ion difference on a hydrogen ion difference curve,
measuring rate of change of hydrogen ion difference per unit of acid equivalent,
ceasing addition of acid when the slope of the titration curve is essentially zero.

4. An improved method for encapsulating lipid material in a proteinaceous mixture, the method comprising treating the proteinaceous mixture by adding an alkali such as calcium hydroxide or other alkali to cause the pH of the mixture to be raised to a basic endpoint pH range where proteins in the proteinaceous mixture will be solubilized to form a gel; maintaining the proteinaceous mixture at a temperature above the melting point of a lipid material, optimally in a range between about 50° to 55° C.; adding an amount of lipid material to the alkali-treated proteinaceous mixture to provide a dispersion with a ratio of lipid to proteinaceous mixture in a range from about 20 to 80, respectively; adding an acid to the lipid material/proteinaceous mixture dispersion to cause the pH of the dispersion to be lowered to an acidic endpoint where the proteins in the dispersion will encapsulate the lipid material;

wherein the improvement comprises:
adding an acid in a smooth and controlled manner to the lipid material/proteinaceous mixtures dispersion while pumping the dispersion through said fixed mixing means which causes the formation of lipid droplets encapsulated by protein without the entrainment of air into said dispersion or said lipid droplets.

5. An improved method for encapsulating lipid material in a proteinaceous mixture, the method comprising treating the proteinaceous mixture by adding an alkali such as calcium hydroxide or other alkali to cause the pH of the mixture to be raised to a basic endpoint pH range where proteins in the proteinaceous mixture will be solubilized to form a gel; maintaining the proteinaceous mixture at a temperature above the melting point of a lipid material, optimally in a range between about 50° to 55° C.; adding an amount of lipid material to the alkali-treated proteinaceous mixture to provide a dispersion with a ratio of lipid to proteinaceous mixture in a range from about 20 to 80, respectively; adding an acid to the lipid material/proteinaceous mixture dispersion to cause the pH of the dispersion to be lowered to an acidic endpoint where the proteins in the dispersion will encapsulate the lipid material;

wherein the improvement comprises:
determining an optimum pH of solubilization as an alkali hydrogen ion difference on a hydrogen ion difference curve,
measuring rate of change of hydrogen ion difference per unit of acid equivalent,
ceasing addition of alkali when the slope of the titration curve is essentially zero,
determining a pH of encapsulation by titration as an acidic hydrogen ion difference on a hydrogen ion difference curve,
measuring rate of change of hydrogen ion difference per unit of acid equivalent,
ceasing addition of acid when the slope of the titration curve is essentially zero.

6. An animal feed product produced in accordance with the process of claim 5.

7. An improved method for encapsulating lipid material in a proteinaceous mixture, the method comprising treating the proteinaceous mixture by adding an alkali such as calcium hydroxide or other alkali to cause the pH of the mixture to be raised to a basic endpoint pH range where proteins in the proteinaceous mixture will be solubilized to form a gel; maintaining the proteinaceous mixture at a temperature above the melting point of a lipid material, optimally in a range between about 50° to 55° C.; adding an amount of lipid material to the alkali-treated proteinaceous mixture to provide a dispersion with a ratio of lipid to proteinaceous mixture in a range from about 20 to 80, respectively; adding an acid to the lipid material/proteinaceous mixture dispersion to cause the pH of the dispersion to be lowered to an acidic endpoint where the proteins in the dispersion will encapsulate the lipid material;

wherein the improvement comprises:
determining an optimum pH of solubilization as an alkali hydrogen ion difference on a hydrogen ion difference curve,
measuring rate of change of hydrogen ion difference per unit of acid equivalent,
ceasing addition of alkali when the slope of the titration curve is essentially zero,
determining a pH of encapsulation by titration as an acidic hydrogen ion difference on a hydrogen ion difference curve,
measuring rate of change of hydrogen ion difference per unit of acid equivalent, adding an acid in a smooth and controlled manner to the lipid material/proteinaceous mixtures dispersion while pumping the dispersion through said fixed mixing means which causes the formation of lipid droplets encapsulated by protein without the entrainment of air into said dispersion or said lipid droplets.

ceasing addition of acid when the slope of the titration curve is essentially zero.

8. An animal feed product produced in accordance with the process of claim 7.

9. The process of claim 7 further comprising:

selecting the alkali(s) and the acid(s) used to alter the nutritional and electrolyte value of the finished product.

\* \* \* \* \*